July 7, 1959

R. B. GROVER 2,893,254

SPEED CHANGE DEVICE

Filed Nov. 3, 1955

INVENTOR.
RAYMOND B. GROVER
BY
Mason, Kolehmainen, Rathburn & Wyss
ATTORNEYS

July 7, 1959  R. B. GROVER  2,893,254
SPEED CHANGE DEVICE
Filed Nov. 3, 1955  4 Sheets-Sheet 2

INVENTOR.
RAYMOND B. GROVER
BY
ATTORNEYS

July 7, 1959  R. B. GROVER  2,893,254
SPEED CHANGE DEVICE
Filed Nov. 3, 1955  4 Sheets-Sheet 3
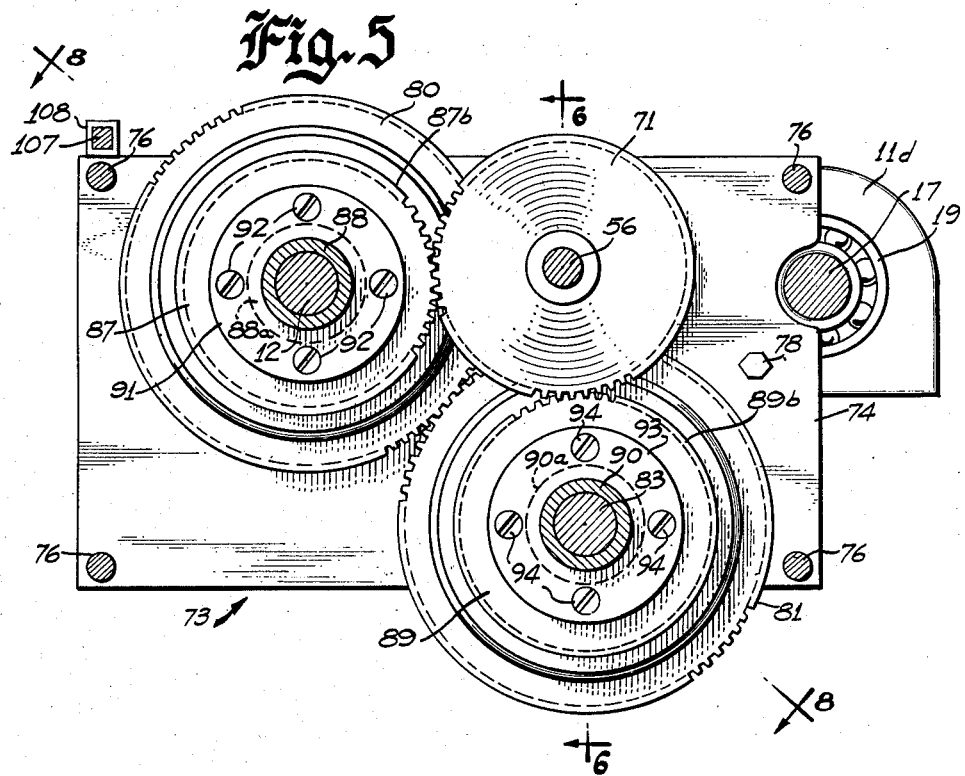
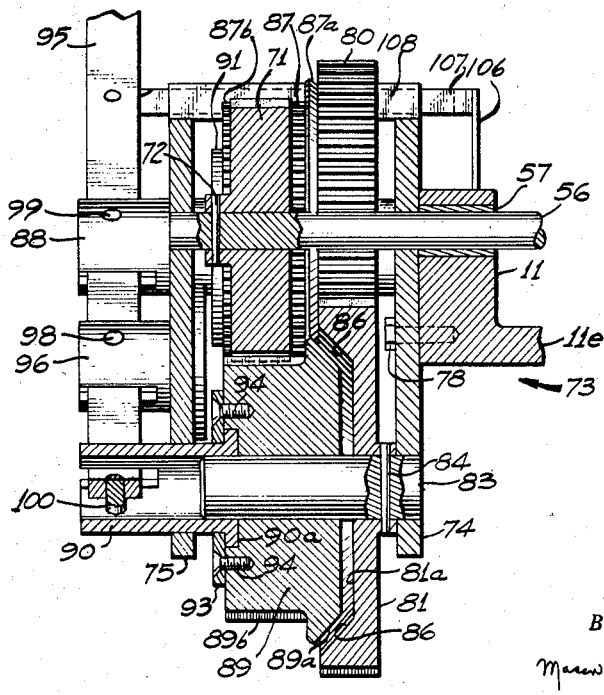
INVENTOR.
RAYMOND B. GROVER
BY
ATTORNEYS July 7, 1959  R. B. GROVER  2,893,254
SPEED CHANGE DEVICE
Filed Nov. 3, 1955  4 Sheets-Sheet 4
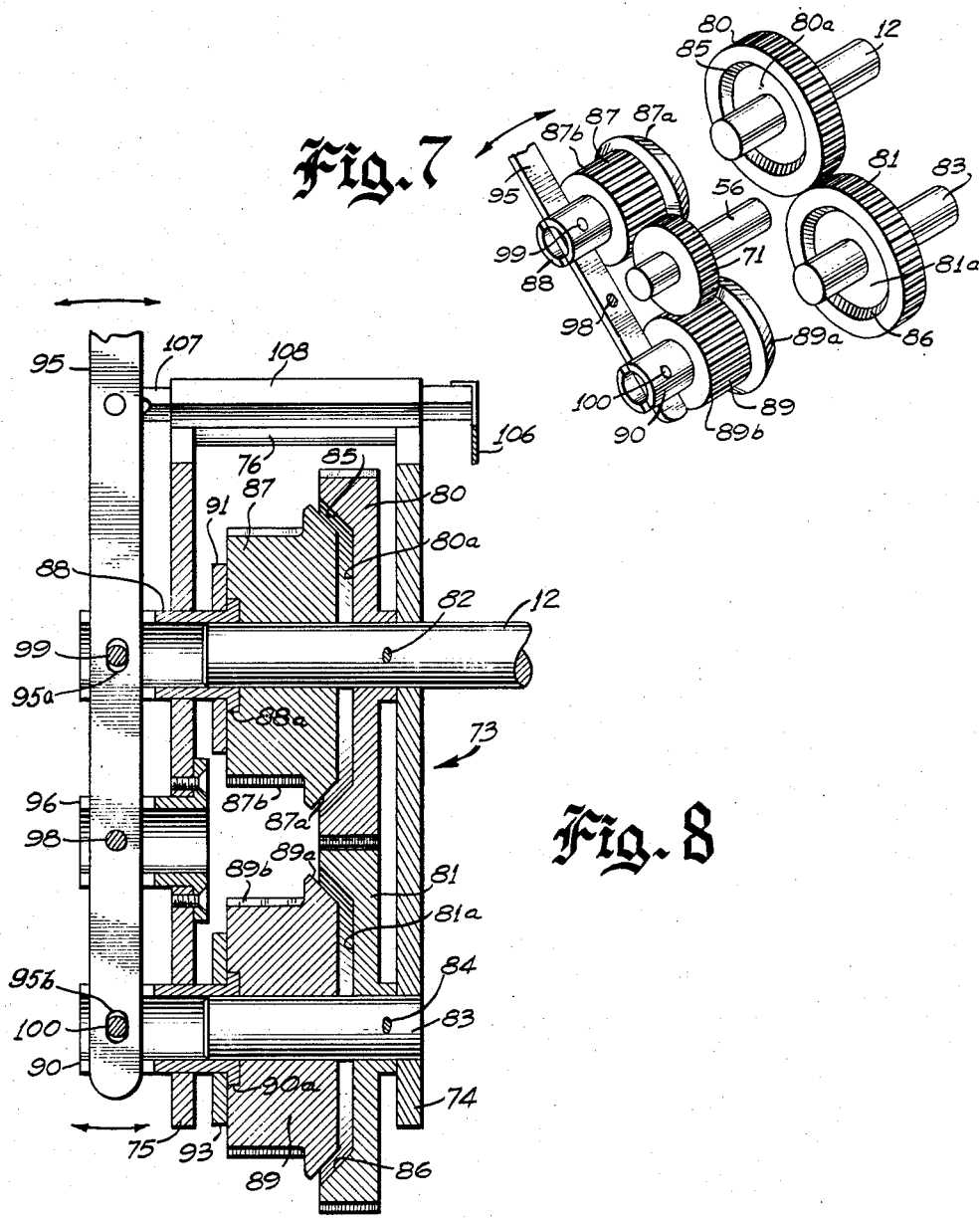
INVENTOR.
RAYMOND B. GROVER
BY
ATTORNEYS

United States Patent Office 2,893,254
Patented July 7, 1959

2,893,254

SPEED CHANGE DEVICE

Raymond B. Grover, Fairbury, Ill.

Application November 3, 1955, Serial No. 544,649

5 Claims. (Cl. 74—230.17)

The present invention relates to a speed change device, and, in particular, to a variable speed device wherein continuous speed variation within a predetermined range is obtainable in a simple manner.

In many applications it is desirable to be able to operate devices at different speeds from a constant speed source of mechanical energy. In tool shops, for example, there is usually a constant speed source of power such as individual electric motors, line shafts and the like. To operate a driven shaft at a variable speed from a driving shaft driven at constant speed, numerous speed change devices have been employed. One way of accomplishing this was to provide a plurality of pulleys of different diameter on the driving shaft and similar pulleys on the driven shaft, and shift the belt from pulley to pulley for the desired speed change. Unfortunately, this arrangement did not provide sufficient speed variation, since it was limited to a plurality of selected speeds determined by the number of pulleys of different size on the driven and driving shafts. It was recognized that a speed change device should provide continuous adjustment of speed rather than a stepped adjustment with a limited number of steps. Numerous speed change devices have been suggested for providing "stepless" speed change, but all have had numerous shortcomings, among them being high cost, lack of simplicity, and so forth. In prior art arrangements the devices included spring loaded pulleys which did not insure the same speed for the same adjustment every time. It would be desirable to provide a speed change device in which the pulley centers are always the same and a positive adjustment is provided which will assure the same identical speed change with the same setting every time.

It would be desirable to provide a speed change mechanism for transmitting force between a constant speed driving shaft and a variable speed driven shaft which furnishes continuous speed change within a range and which involves a simple and compact device, inexpensive to manufacture, and which will give many years of trouble-free service. It would also be desirable for such a speed change mechanism to include automatic means for actuating a change speed adjustment apparatus in either direction with automatic means for limiting operation to the range of speed of the speed change device.

Accordingly, it is an object of the present invention to provide a speed change device having the desirable characteristics described above.

It is another object of the present invention to provide a speed change device having a single pair of pulleys mounted on a driving shaft and driven shaft, respectively, and drivingly interconnected by a V-belt, with simple means for adjusting the effective diameters of said pulleys in a complementary manner.

Still another object of the present invention is to provide an improved speed change device comprising a pair of pulleys each including a cooperating fixed pulley-half and a movable pulley-half with means for adjusting the effective diameters of the pulleys.

A further object of the present invention is to provide an improved speed change device of the type including driving and driven pulleys interconnected by a V-belt with means for changing the effective diameters of said pulleys, wherein there is provided an automatic mechanism for actuating the means for changing the effective diameters of said pulleys.

Further objects and advantages of the present invention will be come apparent as the following description proceeds and the features of novelty which characterize the invention will be pointed out with particularity in the claims annexed to and forming a part of this specification.

For a better understanding of the present invention, reference may be had to the accompanying drawings in which:

Fig. 5 is a sectional view taken along line 5—5 of Fig. 4;

Fig. 6 is a view taken substantially along line 6—6 of Fig. 5, assuming that Fig. 5 shows the complete structure;

Fig. 7 is an exploded perspective view, somewhat reduced in size, of the automatic mechanism of the speed change device of Fig. 6; and Fig. 8 is a sectional view taken substantially along line 8—8 of Fig. 5, assuming that Fig. 5 shows the complete structure.

Briefly, the present invention comprises a speed change device including a pair of pulleys drivingly interconnected by an endless V-belt, which pulleys comprise fixed and axially movable pulley-halves. In addition, the variable speed device includes an adjustment apparatus adapted to move the shiftable pulley-halves relative to the fixed pulley-halves in order to vary the effective diameters of the respective pulleys. Furthermore, in a second embodiment of the speed change device, there is provided an automatic power driven mechanism selectively operable for actuating the adjustment apparatus for changing the effective pulley diameters, which mechanism includes a simple lever for initiating operation thereof and a limiting device for automatically stopping operation thereof when the pulleys are moved to either of their extreme relative axial positions.

Figures 1, 2:
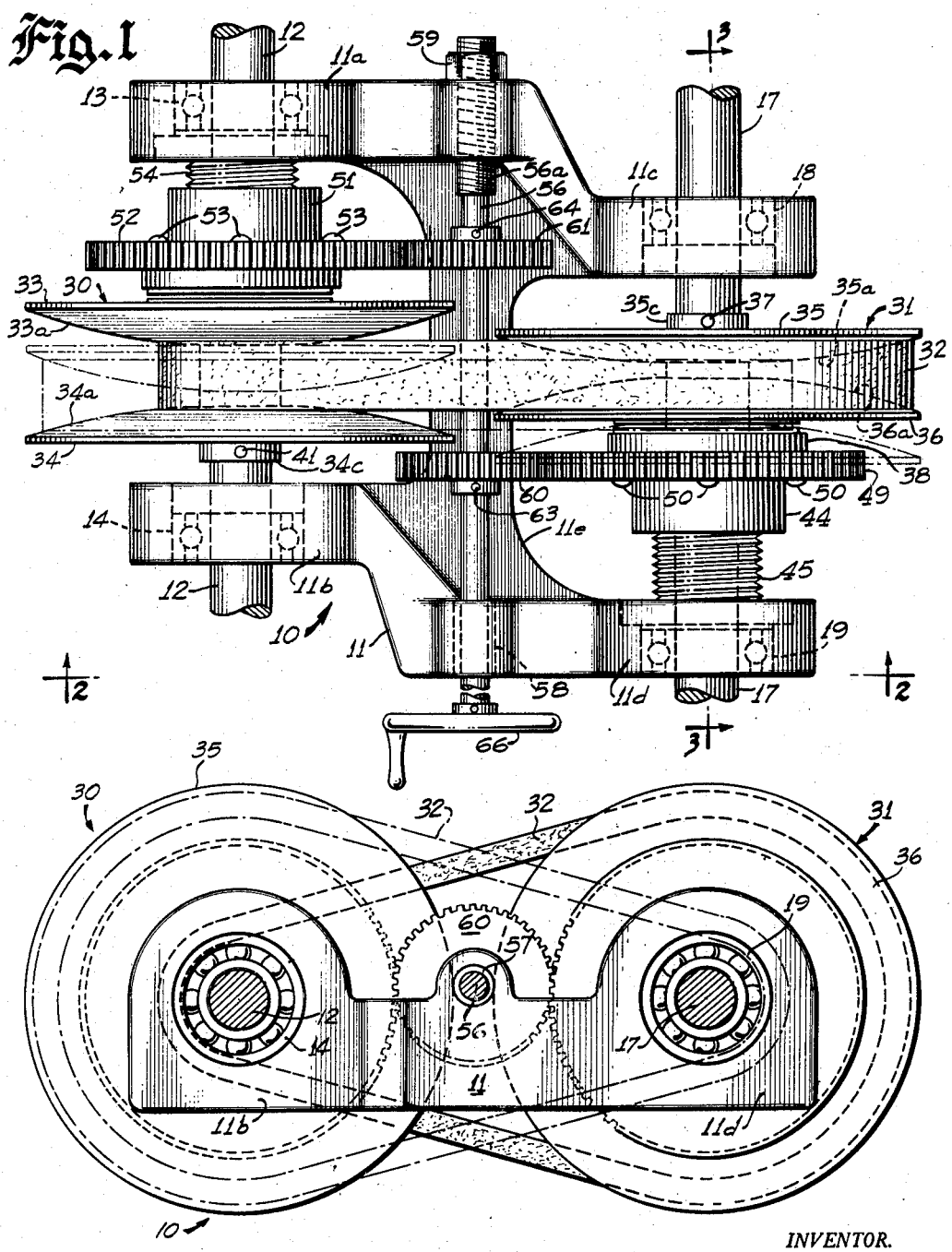
Fig. 1 is to top plan view of the speed change device embodying the present invention showing two extreme positions of the pulleys and interconnecting belt.
Fig. 2 is a front elevational view of the speed change device of Fig. 1, shown with the shafts in section, and further showing the driving belt in two extreme positions.
Figure 3:
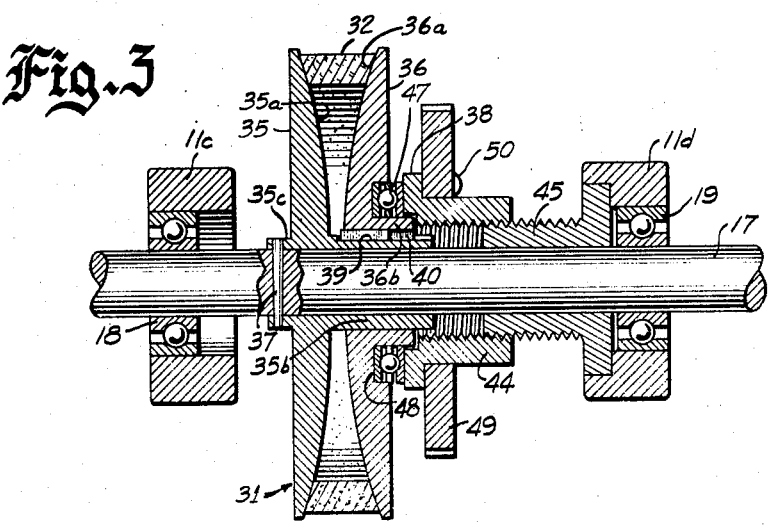
Fig. 3 is a sectional view taken along line 3—3 of Fig. 1.

Referring now to the drawings, there is illustrated in Figs 1 to 3 a speed change device, designated generally by the reference numeral 10, embodying the features of the present invention, which is particularly adapted to transmit rotary motion between a constant speed driving shaft and a variable speed driven shaft. The device is especially useful in connection with machine tools such as lathes, drill presses and the like. As illustrated, the device 10 includes a somewhat H-shaped frame 11 having generally opposing pairs of arms 11a and 11b extending in one direction, and similar arms 11c and 11d extending in the opposite direction. These arms 11a, 11b, 11c and 11d are interconnected by an intermediate arm completing the H, which is generally perpendicular to the other arms and which is designated by the reference numeral 11e. A constant speed rotatable driving or input shaft 12 is journaled in suitable bearings 13 and 14 supported by the ends of the arms 11a and 11b, respectively, remote from intermediate arm 11e of H-frame 11. In a similar manner, a rotatable driven or output shaft 17 is journaled in bearings 18 and 19 supported by the ends of the arm 11c and 11d, respectively, remote from intermediate arm 11e of H-frame 11. It will be evident that the driving shaft 12 and the driven shaft 17 are supported in spaced parallel relationship in H-frame 11 for relative rotation therewith. The bearings 13, 14, 18 and 19 are preferably all identical and are illustrated as ball bearings. It will be understood that the driving shaft 12 is rotated at constant speed by any suitable prime mover, and the driven shaft 17 is driven at variable speed from the shaft 12 by means described hereinafter.

In order to transmit constant speed rotary motion of the driving shaft 12 to variable speed rotary motion of the driven shaft 17, there is provided a driving pulley 30 rotatable with shaft 12 and a driven pulley 31 rotatable with shaft 17, which pulleys 30 and 31 are interconnected by an endless V-belt 32. The pulley 30 is disposed between the arms 11a and 11b of H-frame 11, while the pulley 31 is disposed between the arms 11c and 11d. Each of these pulleys includes a pair of relatively movable pulley-halves, and, except for the fact that the relative movement between the pulley-halves of pulleys 30 and 31 is opposite, the two pulleys are substantially identical. Pulley 30 includes pulley-halves 33 and 34, which are operatively connected to be driven by driving shaft 12. Similarly, pulley 31 includes pulley-halves 35 and 36, which are operatively connected to drive driven shaft 17. Considering, first, pulley 31, which is shown in section in Fig. 3 of the drawings, the pulley-half 35 is of platelike configuration, having one curved face defining a belt engaging portion 35a. Extending from the curved face 35a is a sleevelike hub portion 35b. A similar but considerably shorter sleevelike hub portion 35c extends from the other face of pulley-half 35. The hub portions having their axes concentric, the shaft 17 extends therethrough and through an opening in the platelike portion which is merely a continuation of the aligned openings in the hub portions 35b and 35c. In order to fix the pulley-half 35 to the driven shaft 17, there is provided a pin 37 extending through aligned openings in shaft 17 and hub 35c.

The pulley-half 36, which is axially movable along the shaft 17, also has a curved belt engaging surface 36a which complements the driving surface 35a of pulley-half 35 to define a V-shaped space therebetween, with the arms of the V slightly curved. The pulley-half 36 has a central opening of a size to receive therein the hub portion 35b. In order drivingly to relate pulley-half 36 and shaft 17, there is provided a key 37 receivable in a keyway defined by slots 39 and 40 in the exterior of hub 35b and in the central opening in pulley-half 36, respectively.

With the above-described arrangement the axial movable pulley-half 36 is effectively telescoped over the hub portion 35b of the fixed pulley-half 35. Preferably, pulley-half 36 is provided with an annular extension 36b extending from the side thereof opposite the belt engaging portion 36a to increase the strength and stability of movement of the movable pulley-half 36. The movable pulley-half 36, while rotatable with the fixed pulley-half 35, is enabled to be moved axially relative to the fixed pulley-half 35.

The pulley 30, except for being mounted in a reverse position on shaft 12 relative to the mounting on shaft 17 of the pulley 31, is identical with the pulley 31, the pulley-half 34 being identical with the pulley-half 35 and being fixed by a pin 41 to the shaft 12 which extends through a hub portion 34c. Moreover, the fixed pulley-half 34 includes the hub portion 34b, which is adapted to telescope with the pulley-half 33. Also, the pulley-half 33 is provided with a curved belt engaging surface 33a, while the pulley-half 34 is provided with a belt engaging surface 34a. It is apparent, therefore, that the pulley-halves 34 and 35 of the pulleys 30 and 31, respectively, are fixed to their shafts 12 and 17, while the pulley-halves 33 and 36 are axially movable along these shafts to increase and decrease the space between the cooperating pulley-halves of each pulley 30 and 31. In full lines in Figs. 1 and 2 there is illustrated the pulley 31, with the pulley-halves 35 and 36 moved close together effectively to provide the pulley 31 with the maximum diameter. At the same time the pulley-halves 33 and 34 of pulley 30 are shown separated to a substantially maximum extent to insure an effective minimum diameter of the pulley 30. With this arrangement the driven shaft 17 will rotate at a lower speed than the driving shaft 12, which latter may be considered a constant speed shaft. In dashed lines in Figs. 1 and 2 of the drawings, the pulleys 30 and 31 and associated belt 32 are shown at the opposite extreme operating position of the speed change device 10, in that the pulley 30 is shown with the maximum effective diameter, and the pulley 31 is shown with the minimum effective diameter to insure that the driven shaft 17 operates at a much higher speed than the driving shaft 12. By simultaneously positioning the axially movable pulley-halves 33 and 36 of the two pulleys 30 and 31 relative to the cooperating pulley-halves 33 and 35, respectively, any speed variation between the extremes obtainable with the positions indicated by solid and dashed lines in Figs. 1 and 2 is possible.

It will be appreciated that the movable pulley-halves 33 and 36 must be simultaneously axially movable in opposite directions along their respective shafts 12 and 17. To accomplish this, however, each pulley-half 33 and 36 is provided with an identical mechanism for providing a thrust in a direction to increase the effective pulley diameter. To this end the pulley 31, as is best shown in Figs. 1 and 3 of the drawings, is provided with an internally threaded sleevelike thrust collar 44 threadedly mounted on an externally threaded stationary thrust member 45. The thrust member 45 is suitably supported against rotation in the arm 11d of H-frame 11 concentric with the shaft 17 and between arms 11c and 11d. As the thrust collar 44 is rotated relative to thrust member 45, it being in threaded engagement with the thrust member 45, it will move axially along the shaft 17 in dependence upon the pitch of the threads provided interiorly of the thrust collar or sleeve 44 and exteriorly of the thrust member 45. The thrust sleeve 44 is adapted to engage with a thrust bearing 47 suitably mounted in an annular recess 48 defined in the pulley-half 36 on the surface thereof opposite the belt engaging surface 36a. Consequently, rotation of the thrust sleeve 44 in one direction will apply a force to the thrust bearing 47, moving the pulley-half 36 toward the pulley-half 35. In order to rotate the thrust sleeve 44, there is preferably secured thereto a gear 49 by any suitable means such as rivets or bolts 50.

By reference to Fig. 1 of the drawings, it may be noted that the axially movable pulley-half 33 is provided with identical means for applying thereto a thrust in a direction to reduce the effective pulley diameter. Accordingly, there is provided a thrust collar or sleeve 51 identical with the sleeve 44 to which is secured a gear 52 identical with the gear 49. Any suitable means for securing the sleeve 51 and gear 52 together may be employed, such, for example, as the rivets 53. As in the case of the thrust sleeve or collar 44, the sleeve 51 is interiorly threaded for engagement with exterior threads formed on a thrust member 54 which is suitably supported against rotation in the arm 11a of the H-frame 11 concentric with the shaft 12. A thrust bearing similar to the thrust bearing 47, not visible in the drawings, will be provided for pulley-half 33 of pulley 30.

For the purpose of causing simultaneous movement in opposite directions of the pulley-halves 33 and 36, and hence for effectively changing the speed of driven shaft 17, there is provided an adjustment mechanism comprising a shaft 56 disposed generally parallel with the arm 11e of the H-frame 11. One end of the shaft 56 is journaled in a bearing 58 suitably supported in the H-frame 11 at the junction between the arms 11b and 11d. The other end of the shaft 56 is preferably threaded, as indicated at 56a, for threaded engagement with a suitable nut 59 secured as by welding or otherwise to the H-frame 11 at the junction between the arms 11a and 11c. It will be understood that, if desired, the H-frame 11 may be threaded to receive the threaded portion 56a of the shaft 56, in which case the nut 59 may be dispensed with. Secured to shaft 56 at spaced positions thereon are a pair of gears 60 and 61, which are fixed thereto as by pins 63 and 64. The gear 61 is illustrated as meshing with the gear 52, while the gear 60 is illustrated as meshing with the gear 49. The end of the shaft 56 projecting beyond the H-frame 11, and specifically the arms 11b and 11d thereof, has secured thereto a suitable manually actuatable crank wheel 66. It will be apparent that rotation of the crank wheel 66 will cause simultaneous movement in the same direction of the gears 49 and 52. Such movement of the gears 49 and 52 will cause one of the movable pulley-halves 33 or 36, depending upon the direction of the threads on the thrust members 45 and 54, to move in an effective increasing pulley diameter direction, and will permit the other movable pulley-half to be free to move in an effective decreasing pulley diameter direction. Obviously, when the belt 32 is in place and the effective diameter of one of the pulleys 30 or 31 is increased, the tension on the belt will cause it to produce relative separation of the pulley-halves of the other pulley thereby supplying the force for moving the associated axially movable pulley-half in an effective decreasing pulley diameter direction.

In an embodiment built in accordance with the present invention, the gears 49 and 52 were each provided with one hundred teeth, and the gears 60 and 61 were each provided with fifty teeth. With this arrangement the threads on the threaded portion 56a had half the pitch of the threads on the thrust members 45 and 54, thereby insuring that the gears 52 and 61 always remained in mesh, and, similarly, that the gears 49 and 60 always remained in mesh regardless of the relative positions of the pulley-halves of pulleys 30 and 31.

The belt 32 is preferably the conventional V-belt extensively sold on the market today which has a cross section as best shown in Fig. 3 of the drawings, somewhat in the form of a trapezoid. The belts commonly available have an angle between the sides and the top or bottom thereof of the order of fifteen degrees, which is commonly referred to as a pitch of fifteen degrees. I have discovered that if such a V-belt is made to curve around a very small radius, the so-called pitch angle of the belt reduces to twelve degrees or even less. In accordance with the present invention, the belt engaging surfaces, such as 33a and 34a of the pulley 30, and 35a and 36a of the pulley 31, are curved, so that as the effective diameter of the pulley decreases, the belt engaging surfaces of the pulleys are designed to accommodate a belt of lower pitch, thus insuring maximum efficiencies under all operating conditions.

It may be desirable for the pulley-halves of pulley 30 to be slightly different from the pulley-halves of pulley 31. At high speeds of the driven pulley the tension need not be as great as at low speeds thereof since slippage is less. Hence, by changing slightly the shape of the faces such as 35a and 36a of pulley 31 relative to that shape of faces 33a and 34a of pulley 30 the belt tension may be decreased slightly at high speeds of the driven shaft 17. In any event, with the above-described arrangement, the two pulleys operate on the same fixed centers and unlike prior art devices do not depend on movable centers to maintain spring tension. Moreover, a positive speed adjustment is assured and for the same settings the same speed changes can always be obtained.

In view of the detailed description included above, the operation of the speed change device of Figs. 1 to 3 of the drawings will readily be understood by those skilled in the art and no further discussion thereof need be included herewith. It will be appreciated that with the above-described arrangement an infinite variation of speed between the maximum and minimum limits determined by the permissible effective pulley diameters of the pulleys 30 and 31 is obtainable. The belt 32 is always perpendicular to the driving and driven shafts, and the effective distance between the pulleys 30 and 31 is constant regardless of the effective diameter of the particular pulleys. Moreover, the speed change can be obtained in a very simple manner merely by rotating the shaft 56 in one direction or the other. The speed change device is very simple and compact, and can readily be attached to any existing equipment.

Although the arrangement described above is found to be very satisfactory, operators of machine tools find it desirable to actuate the speed change device many times during a single machining operation and, consequently, it would be desirable to provide power operated means for actuating the shaft 56 instead of actuating the same by the crank wheel 66. Accordingly, in Figs. 4 to 8, inclusive, there is illustrated an attachment for the speed change device disclosed above whereby by merely actuating a lever in either one of two directions the speed change device is automatically operated to change the speed of the driven shaft 17 relative to the driving shaft 12. In order to simplify the disclosure, only a portion of the speed change device described above is illustrated in Fig. 4, and the corresponding parts are designated by the same numerals as in the preceding figures.

Figure 4:
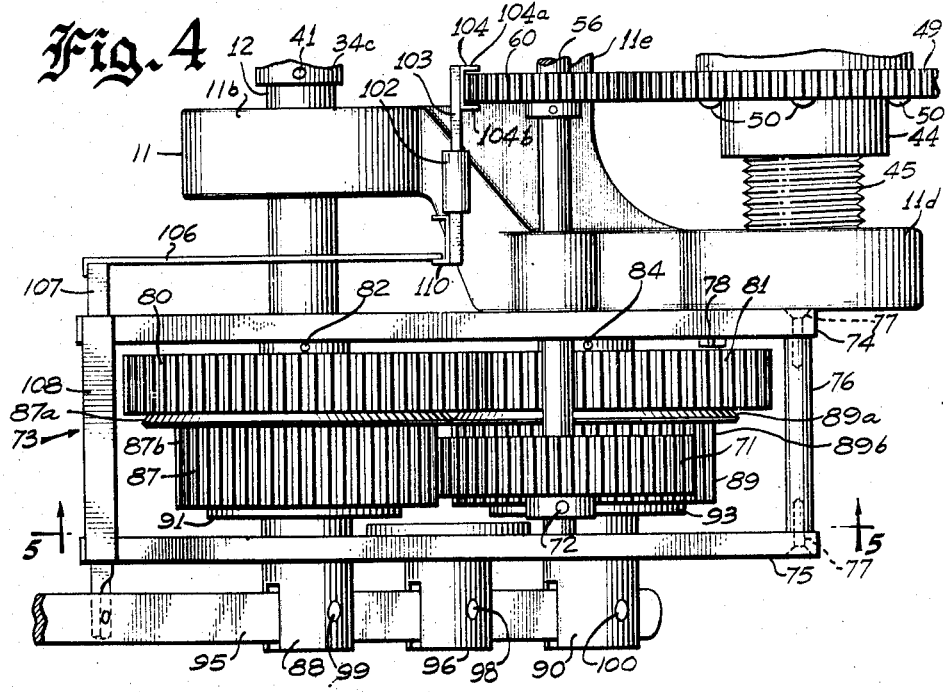
Fig. 4 is a partial view similar to Fig. 1 of another embodiment of the speed change device embodying the present invention.

As illustrated in Figs. 4 to 8 of the drawings, there is provided an automatic mechanism for selectively actuating from a suitable source of power a shaft such as the shaft 56 described above. In Fig. 4 and the remaining figures of the drawings this shaft is designated as 56, as it was in the preceding embodiments, and instead of having a crank wheel such as 66 attached thereto, a suitable gear 71 is secured thereto as by the pin 72.

Considering now the automatic adjustment mechanism for driving gear 71 in a manner to actuate the shaft 56 as it was actuated by the crank wheel 66 described above, there is provided a subassembly generally designated by the reference number 73, which is a power operated mechanism for automatically and in a very simple manner driving the gear 71 selectively in either direction in accordance with the desired speed change to be accomplished between the driving shaft 12 and the driven shaft 17. As best shown in Figs. 4, 5, 6 and 8 of the drawings, the automatic adjustment mechanism 73 is somewhat in the form of a subassembly comprising a pair of parallel plates 74 and 75 which are maintained in parallel spaced relationship by a plurality of parallel disposed spacer rods 76 which have tapped openings at the ends thereof to receive suitable fastening means 77 which extend through suitable openings defined in the plates 74 and 75. The frame of the automatic adjustment mechanism 73 comprising the plates 74 and 75 and the spacer rods 76 is preferably secured to the H-frame 11 as by suitable fastening means 78, best shown in Figs. 5 and 6 of the drawings. In order that this can be accomplished, the plates 74 and 75 must be provided with suitable aligned openings to permit the shaft 56 to extend therethrough with the gear 71 secured to the portion of shaft 56 disposed between plates 74 and 75. Since the shaft 56 moves axially in the operation thereof by virtue of the threaded end 56a, as described in detail in connection with Fig. 1 of the drawings, the space between the plates 74 and 75 must be sufficient to permit such axial movement, which will, of course, also cause movement of the gear 71 pinned thereto.

For the purpose of selectively actuating the gear 71 to rotate in either direction, there is provided in the automatic adjustment mechanism or unit 73 a driven gear 80 and an idler gear 81, which gears are of identical configuration. The driven gear 80 is pinned to a suitable driving shaft which may be connected to any prime mover. Since the shaft 12, designated as the driving shaft, is driven at constant speed, it may preferably be used to drive the gear 80. Accordingly, and as illustrated in the drawings, the shaft 12 extends through an opening in the plate 74, and the driven gear 80 is pinned thereto as by a pin 82. The driven gear 80 is disposed in the space between the plates 74 and 75. The idler gear 81, on the other hand, is pinned to a stub shaft 83, as by the pin 84, which is journaled for rotation in the frame comprising the plates 74 and 75, as will be described in greater detail hereinafter. The driven shaft 12 and the stub shaft 83 are disposed in spaced parallel relationship so that the identical gears 80 and 81 are in mesh, as is clearly indicated in Figs. 5 and 8 of the drawings. With this arrangement it is obvious that if the gear 80 is rotated in a counterclockwise direction, the gear 81 will be rotated in a clockwise direction and vice versa. For a purpose which will be described hereinafter, each of the gears 80 and 81 is provided with a recess in one face thereof, designated as 80a for the gear 80 and 81a for the gear 81. These recesses have somewhat conical walls defining a sort of clutch face for a purpose which will become apparent as the ensuing description proceeds. The conical clutch face for the gear 80 is designated as 85, and for the gear 81 as 86.

For the purpose of cooperating with the clutch face 85 defined in the recess 80a of gear 80, there is provided a clutch cone member 87 having a conical clutch surface 87a thereon to cooperate with the clutch face 85 in recess 80a. The clutch cone 87 also includes a gear portion defining a spur gear 87b integral with the clutch cone 87. Preferably, the clutch cone 87 is mounted concentrically with the driving shaft 12 so as to be rotatable about the same axis as the axis of shaft 12. As illustrated, the clutch cone 87 is secured to a suitable sleeve member 88 journaled in the plate 75 in a manner to permit axial movement of the sleeve 88 and the clutch cone 87 secured thereto, thus permitting, as desired, frictional driving engagement between the clutch surface 87a of the clutch cone 87 and the cooperating surface 85 defined in the recess 80a. A similar clutch cone 89 is provided for the gear 81, which clutch cone 89 has a conical clutch surface 89a adapted to cooperate with the clutch face 86 defined within the recess 81a of the gear 81. Also, the clutch cone 89 has a portion defining the spur gear 89b. Like the clutch cone 87, the clutch cone 89 is secured to a sleeve 90 journaled in the plate 75 of the frame defining the automatic adjustment mechanism 73. This sleeve and the clutch cone 89 are concentrically mounted with respect to the stub shaft 83, and limited axial movement of the sleeve 90 and the clutch cone 89 are permissible to permit selective engagement of the clutch cone 89 with the cooperating clutch face 86 defined in the gear 81. It will be appreciated that the sleeve 88 may be rotatably secured to the clutch cone 87 in any suitable manner. As illustrated, the sleeve 88 is provided with a flange 88a adapted to be rotatably received in a recess defined in one face of the clutch cone 87, and a suitable clamping plate 91 holds the two as a unitary assembly by virtue of the screws 92. The identical arrangement for rotatably securing the sleeve 90 to the clutch cone 89 is employed, and, as illustrated in Figs. 5 and 8 of the drawings, a clamping plate 93 clamps the flange 90a of the sleeve 90 to the clutch cone 89 by virtue of the screws 94, which flange 90a is disposed in a suitable recess defined in the clutch cone 89.

It will be understood that the clutch cone 87 will be driven by the gear 80 if the clutch face 87a is in frictional engagement with the cooperating clutch face 85 defined in recess 80a. On the other hand, clutch cone 89 will be rotated with the gear 81 if the cooperating clutch faces 89a and 86 are in driving engagement. In accordance with the present invention, the gear 71 provided on the shaft 56 of the speed change mechanism is disposed in driving engagement with both of the gear portions 87b and 89b of the clutch cones 87 and 89. This arrangement is best shown in Fig. 5 of the drawings.

From the above description it will be apparent that if the clutch cone 87 is moved into driving engagement with the gear 80, it will drive the gear 71 secured to the shaft 56 in a predetermined direction. Under these conditions, the clutch cone 89 must be free of the idler gear 81 so that it may rotate with respect to the stub shaft 83, since it also is in driving engagement with the gear 71. If, on the other hand, the clutch cone 89 is moved axially into driving engagement with the gear 81, the shaft 56 will be rotated in the opposite direction, and in this case the clutch cone 87 must be free to rotate about driving shaft 12. The gear portions 87b and 89b of the clutch cones 87 and 89 must have sufficient axial length to accommodate the axial movement of the gear 71 by virtue of the axial movement of the shaft 56.

For the purpose of providing a simple means for selectively rendering either the clutch cone 87 or the clutch cone 89 effective and simultaneously rendering the other clutch cone ineffective, there is provided a manual lever 95 pivotally mounted to a suitable stationary support 96 secured to the frame comprising the plates 74 and 75. As illustrated, the lever 95 is pivoted to the support 96 by a pivot pin 98 disposed intermediate the axial movable sleeves 88 and 90. Preferably, the axially movable sleeves 88 and 90 are bifurcated at the ends thereof extending beyond the plate 75 on the sides thereof remote from the plate 74, and the lever 95 is adapted to be received in these bifurcations, as is clearly shown in Figs. 4, 6 and 8 of the drawings. Moreover, the sleeve 88 is secured to the lever 95 as by pivot pin 99 which extends through an elongated slot 95a (Fig. 8) in the lever 95, while the sleeve 90 is secured to the lever 95 as by pin 100 which extends through an elongated slot 95b in the lever 95. Consequently, pivotal movement of the lever 95 about the pivot pin 98 will cause either the clutch cone 87 or the clutch cone 89 to move into frictional driving engagement with its cooperating gear 80 or 81, as the case may be. Simultaneously, the other clutch cone will be moved out of driving engagement. Thus, by a simple movement of the lever 95, the speed of the speed change device 10 may selectively be varied between the limits determined by the permissible ratios of the pulleys 30 and 31. I have found that if the clutch cones have an angle of the order of 12° that a self-energizing arrangement is provided and the pins 99 and 100 may be omitted. It is merely necessary for the lever 95 to touch either the sleeve 88 or the sleeve 90 to render the associated clutch cone effective. It will be understood that the gears between plates 74 and 75 may be disposed within an oil filled gear casing if desired. Also, if desired, the lever 95 may be solenoid actuated whereupon the operator may engage one push-button for a speed increase and another for a speed decrease.

In order to avoid any difficulty with respect to the automatic adjustment mechanism 73 when the speed change device reaches either of its extreme positions with regard to the speed of rotation of the driven shaft 17, there is provided automatic limit means for moving the lever 95 to the neutral position whenever the limit of the adjustment of the speed change device in either direction is reached. To this end there is preferably supported from the H-frame 11 a suitable guide 102 for guiding the movement of a longitudinally movable rod 103. The rod 103 includes at one end thereof a U- shaped member 104 in which the legs 104a and 104b thereof are disposed on either side of the gear 60 so that movement of the gear 60 in an axial direction with the shaft 56 will cause corresponding movement of the rod 103. Moreover, the rod 103 is connected by suitable members 106 and 107 with the lever 95, the member 107 being guided for longitudinal movement by a suitable guide 108 supported on the frame comprising the plates 74 and 75. Thus, when the shaft 56 reaches either extreme in the axial travel thereof, the lever 95 is moved to the neutral position. A suitable lost motion connection of any form should, of course, be provided in the mechanism interconnecting the U-shaped member 104 and the lever 95. Such a lost motion connection is indicated between the member 106 and the rod 103, and is schematically illustrated as comprising a U-shaped member 110 secured to the rod 103 with the legs of the U-shaped member 110 engageable with the member 106 in the extreme positions of the rod 103.

In view of the detailed description included above, the operation of the automatic power operated adjustment mechanism 73 will readily be understood by those skilled in the art. As the operator moves the lever 95 in one direction or the other, the corresponding clutch cone 87 or 89 is rendered effective to rotate the gear 71, and hence the shaft 56 in the selected direction. As the gear 60 reaches either one of its extreme positions in its movement along the axis of shaft 56, it will move rod 103 to either one of its extreme positions. As the rod 103 reaches either one of its extreme positions, the lost motion connection 110 becomes effective to move the lever 95 through members 106 and 107 to its neutral position, thus effectively limiting the operation of the automatic adjustment mechanism 73 to the limits of the speed control device 10.

From the above description it will be understood that there has been provided a very simple automatic power actuated adjustment mechanism 73 preferably driven from the driving shaft 12, but which obviously may be driven from a separate electric motor, if desired, which provides the operator with a simple lever moved very slightly in either direction to provide any selected change of the speed ratio between the driving shaft 12 and the driven shaft 17. The lever 95 may be actuated by almost any part of the operator's body, and the speed may be changed, for example, by moving the lever 95 either to the right or to the left, as indicated by the arrows in Fig. 8 of the drawings.

While there have been illustrated and described several embodiments of the present invention, it will be understood that numerous changes and modifications will occur to those skilled in the art, and it is intended in the appended claims to cover any such changes and modifications as fall within the true spirit and scope of the present invention.

What is claimed as new and desired to be secured by Letters Patent of the United States is:

1. A variable speed transmission comprising a supporting frame, a driving shaft mounted on said frame for rotation about a first axis, a driven shaft mounted on said frame for rotation about a second axis parallel to and spaced from said first axis, a pair of adjustable diameter pulleys mounted on said driving and driven shafts, means interconnecting said pulleys, a control shaft coacting with said frame for rotation about and for translatory movement along a third axis parallel to and disposed between said first and second axes, means connecting said control shaft with both of said pulleys so that rotation of said control shaft in one direction increases the diameter of one of said pulleys and decreases the diameter of the other of said pulleys and rotation of said control shaft in the opposite direction decreases the diameter of said one pulley and increases the diameter of said other pulley, said rotation of said control shaft in opposite directions causing oppositely directed translatory movement of said control shaft along said third axis, a driven element secured to said control shaft, a pair of interengaging driving elements rotating in opposite directions, a pair of clutch assemblies mounted on said frame and each including a clutch member movable toward and away from one of said driving elements along a line parallel to said third axis to selectively render different ones of said driving elements effective to drive the driven element on said control shaft while causing translatory movement of the control shaft and the driven element in opposite directions relative to said clutch assemblies during the rotation of said control shaft by a selected one of said driving elements, said control shaft being operatively connected to one of said driving elements through one of said clutch assemblies and said driven element and being both rotated and moved in a translatory manner relative to said frame and said clutch assemblies in response to the operative connection of said control shaft to one of said driving elements, and selector means for rendering one of said clutch assemblies effective.

2. The speed transmission set forth in claim 1 in which the movable clutch members comprise gear elements, said gear elements engaging said driven element on the control shaft, said driven element and said gear elements being disposed within a common plane transverse to said third axis and being movable relative to each other along lines parallel to said third axis.

3. A variable speed transmission comprising a supporting frame, an adjustable diameter pulley rotatably mounted on said frame, a control shaft coacting with said frame for rotary and translatory movement relative to said frame, means connecting said shaft to said pulley so that rotation of said shaft in one direction increases the diameter of said pulley and rotation of the shaft in the opposite direction decreases the diameter of said pulley, said rotation of said shaft in opposite directions causing translatory movement of said shaft in opposite directions, a spur gear on said control shaft, first and second gears interengaging said spur gear, first and second interengaging rotatable input members, a driving member for rotating said input members in respectively opposite directions, and first and second clutches each having an element alternately and respectively movable into a torque coupling condition between said first and second gears and said first and second input members, said control shaft being selectively connected to said input members through said clutches so that actuation of one of said clutches causes an increase in the diameter of said pulley and translatory movement of said control shaft in one direction and actuation of the other of said clutches causes a decrease in the diameter of said pulley and translatory movement of said control shaft in an opposite direction.

4. The transmission set forth in claim 3 wherein is included manually operable means for controlling the operation of said clutches, said manually operable means comprising a pintle positioned between said clutch elements, and a lever pivotally mounted on said pintle and connected to the movable element of each of said clutches on opposite sides of said pintle.

5. A transmission as set forth in claim 3 wherein said driving member comprises a shaft on which said adjustable pulley is fixedly mounted.

References Cited in the file of this patent

UNITED STATES PATENTS

| | | |
|---|---|---|
| 870,202 | Sponsel | Nov. 5, 1907 |
| 1,993,547 | Heyer | Mar. 5, 1935 |
| 2,557,849 | Victory | June 19, 1951 |
| 2,589,897 | Turnbull | Mar. 18, 1952 |
| 2,682,025 | Lewellen et al. | June 22, 1954 |

FOREIGN PATENTS

| | | |
|---|---|---|
| 233,140 | Great Britain | May 7, 1925 |